US010664807B2

(12) United States Patent
Eck et al.

(10) Patent No.: US 10,664,807 B2
(45) Date of Patent: May 26, 2020

(54) RETROACTIVELY MODIFYING DATABASE RECORDS

(71) Applicant: SAP SE, Walldorf (DE)

(72) Inventors: Hagen Eck, Walldorf (DE); Johannes Fenzl, Walldorf (DE); Yulia Kosolapova, Walldorf (DE); Ute Heinemann, Walldorf (DE)

(73) Assignee: SAP SE, Walldorf (DE)

( * ) Notice: Subject to any disclaimer, the term of this patent is extended or adjusted under 35 U.S.C. 154(b) by 349 days.

(21) Appl. No.: 15/377,358

(22) Filed: Dec. 13, 2016

(65) Prior Publication Data

US 2018/0165651 A1 Jun. 14, 2018

(51) Int. Cl.
*G06Q 10/10* (2012.01)
*G06F 16/23* (2019.01)

(52) U.S. Cl.
CPC ..... *G06Q 10/1091* (2013.01); *G06F 16/2365* (2019.01); *G06F 16/2379* (2019.01); *G06Q 10/105* (2013.01)

(58) Field of Classification Search
CPC ............ G06F 17/60; G06F 1/00; G06F 40/00; G06Q 30/04; G06Q 10/00; G06Q 99/00
USPC .................................................. 705/7.11–7.42
See application file for complete search history.

(56) References Cited

U.S. PATENT DOCUMENTS

| 8,700,505 B2 * | 4/2014 | McCrea | G06Q 10/06 705/34 |
| 2004/0019542 A1 * | 1/2004 | Fuchs | G06Q 10/1091 705/32 |
| 2015/0154524 A1 * | 6/2015 | Borodow | G06Q 10/06313 705/7.23 |

FOREIGN PATENT DOCUMENTS

WO WO-2005006138 A2 * 1/2005 ....... G06Q 10/06311

OTHER PUBLICATIONS

Ahn, Ilsoo & Snodgrass, Richard. (1986). Performance Evaluation of a Temporal Database Management System. Sigmod Record. 15. 96-107. 10.1145/16856.16864. (Year: 1986)*

* cited by examiner

*Primary Examiner* — Alan S Miller
*Assistant Examiner* — Jay-Ming Wang
(74) *Attorney, Agent, or Firm* — Buckley, Maschoff & Talwalkar LLC (57) ABSTRACT

Provided are devices and methods for retroactively changing time sheets. In one example, the method includes detecting a change to an attribute associated with a time sheet stored in a database, splitting the time sheet into a first portion of time before the attribute changed and a second portion of time after the attribute changed, retroactively applying the change of the attribute to the second portion of time and preserving the attribute for the first portion of time to generate modified time sheet data, and updating the time sheet stored in the database based on the modified time sheet data to implement the retroactively applied change. Accordingly, the system described herein may automatically identify and process retroactive changes to a time sheet that has already been submitted and stored in a database.

20 Claims, 7 Drawing Sheets

RETROACTIVELY MODIFYING DATABASE RECORDS

BACKGROUND

In an effort to automate and improve time and attendance management processes, many businesses have begun using time and attendance software applications that are deployed on a central backend computing platform such as a network-connected server or cloud platform. These applications manage time-related information for employees and provide managers and supervisors remote access to employee information to identify time-off requests, make changes to schedules, observe and maintain workforce production, and the like. The time and attendance management software may be included within a larger human resources suite of software that provides a richer more comprehensive employee management tool. The automated tool may correlate workforce data along with financial data, optimize workforce productivity, monitor enterprise resource planning (ERP), monitor time and attendance, and monitor employee benefits, across multiple offices, time zones, etc.

Typically, when an employee files or uploads a database record to the system such as a time sheet, the database record is approved by a supervisor and then transferred to a payroll department for storage and processing. At this point, data within the record is typically recorded with the database and includes attributes such as attendance, dates, times, and the like, and is no longer accessible by the employee. However, situations often occur that can cause processing of a stored database record to change, for example, due to a change in salary, change in hours worked, change in overtime pay, a change in position/department within the company, and the like. As an example, an employee's salary may increase on the first day of a month. In this case, the first day of the month may fall in the middle of a week (or bi-weekly period) of a time sheet record. As a result, the pay change may go undetected by the system or the system may have no way of keeping track of both the old pay rate and the new pay rate which are both needed to determine a payment amount for the employee. As a result, the employee may receive their old pay rate for the entire pay period instead of only a part of the period. Furthermore, the system is not capable of retroactively dealing with these changes in an automated fashion within the database. Instead, the organization usually has to write an additional check to compensate for the deficient funds or take out money from a future payment to compensate for an overpayment.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system and method for automatically detecting and retroactively applying changes to time sheets previously stored in a database. The method may be incorporated within a time and attendance management software application that is used by employees to upload time sheets to a central backend where the time sheets may be approved by supervisors and stored for payroll processing. When a time sheet is approved and stored, the time sheet is typically no longer capable of being modified by the employee. However, often times changes occur that affect processing of an employee's time sheet, for example, a change in pay rate, a promotion, a move to a new department, a change in schedule, new laws may be enacted for calculating the time pay rates, new approval workflows for processing time sheets, and many others. When these changes occur during the middle of a pay period such that both the old payment details and the new payment details are needed to process payment, the system is often unable to adjust to payment details being changed in the middle of a pay period. According to various embodiments, the system and method described herein may identify these changes and retroactively apply (i.e., automatically) the detected changes to the time sheet prior to payroll processing and without the need for a system admin to access the time sheet, the employee to update the time sheet, or a supervisor to approve the time sheet.

In some embodiments, the system and method described herein may be implemented by a time and attendance management software application and system. The application may be hosted by a cloud platform, a server, or the like, within the system, and be accessible to user devices via a network such as the Internet or a private network. The time and attendance software may optimize time sheet management by automating a process of processing a time sheet. Furthermore, the software and the system may provide remote access to users, employees, managers, payroll systems, and the like. The time sheets (or data related thereto) may be input into the system, approved by managers, and forward to a payroll system to assign and calculate billings and payments. The software may provide employees with access to self-services through a user interface that enables the employee to enter time data, tax information data, allowances, time-off requests, on-call times, and the like. The software provides managers with visibility of their team members schedules. Also, the software may feed time sheet data directly to the payroll system where payments can be calculated and processed. To assist payroll, the software may generate payroll-related time codes to determine employee pay with a time evaluation component.

Figure 1:
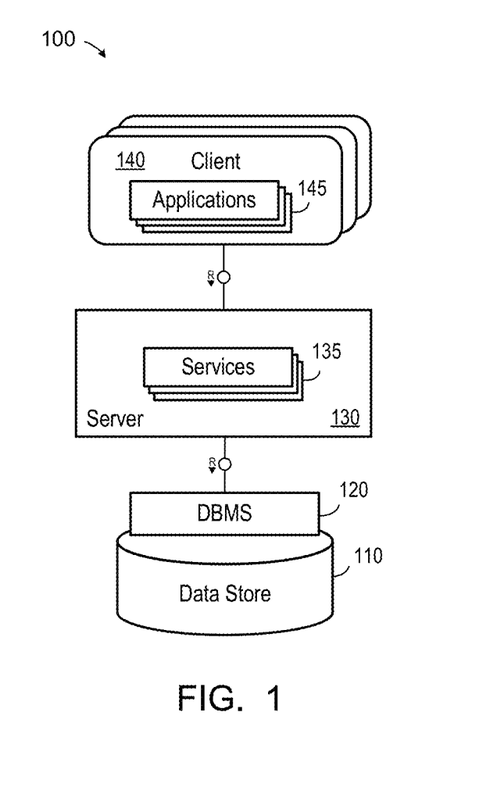
FIG. 1 is a diagram illustrating a system architecture in accordance with an example embodiment.

FIG. 1 illustrates a system architecture 100 in accordance with an example embodiment. It should be appreciated that the embodiments are not limited to architecture 100 or to a database architecture, however, FIG. 1 is shown for purposes of example. Referring to FIG. 1, the architecture 100 includes a data store 110, a database management system (DBMS) 120, a server 130, services 135, clients 140 and applications 145. Generally, services 135 executing within server 130 receive requests from applications 145 executing on clients 140 and provides results to applications 145 based on data stored within data store 110. For example, server 130 may execute and provide services 135 to applications 145. Services 135 may include server-side executable program code (e.g., compiled code, scripts, etc.) which provide functionality to applications 145 by providing user interfaces to clients 140, receiving requests from applications 145 (e.g., drag-and-drop operations), retrieving data from data store 110 based on the requests, processing the data received from data store 110, and providing the processed data to applications 145.

In one specific example, an application 145 corresponds to a time and attendance management application such as used for employees within an organization. In this example, a client 140 executes the time and attendance management application to generate a user interface to a user on a display of the client 140 which allows the user to enter time and billing information, for example, hours worked, days worked, tax information, and the like. The application may pass the time and billing information based on the input to one of services 135. An SQL script may be generated based on the request and forwarded to DBMS 120. DBMS 120 executes the SQL script to return a result set based on data of data store 110, and the application 145 creates a report/visualization based on the result set. As another example, the time and billing information input by the user may be provided directly from the application to the DBMS 120 or the data store 110.

The services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110. The DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known.

Server 130 may be separated from or closely integrated with DBMS 120. A closely-integrated server 130 may enable execution of services 135 completely on the database platform, without the need for an additional server. For example, server 130 may provide a comprehensive set of embedded services which provide end-to-end support for Web-based applications. The services 135 may include a lightweight web server, configurable support for Open Data Protocol, server-side JavaScript execution and access to SQL and SQLScript. Server 130 may provide application services (e.g., via functional libraries) using services 135 that manage and query the data of data store 110. The application services can be used to expose the database data model, with its tables, views and database procedures, to clients 140. In addition to exposing the data model, server 130 may host system services such as a search service.

Data store 110 may include any query-responsive data source or sources that are or become known, including but not limited to a structured-query language (SQL) relational database management system. Data store 110 may include a relational database, a multi-dimensional database, an Extensible Markup Language (XML) document, or any other data storage system storing structured and/or unstructured data. The data of data store 110 may include time sheet related data, employee data, company data, and the like, and be distributed among several relational databases, dimensional databases, and/or other data sources. Embodiments are not limited to any number or types of data sources. In some embodiments, the data of data store 110 may include one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

The architecture 100 may include metadata defining objects which are mapped to logical entities of data store 110. The metadata be stored in data store 110 and/or a separate repository (not shown). The metadata may include information regarding dimension names (e.g., country, year, product), dimension hierarchies (e.g., country, state, city), measure names (profit, units, sales, etc.) and any other suitable metadata. According to some embodiments, the metadata includes information associating users, queries, query patterns and visualizations. The information may be collected during operation of system and may be used to determine a visualization to present in response to a received query, and based on the query and the user from whom the query was received.

Each client 140 may include one or more devices executing program code of an application 145 for presenting user interfaces to allow interaction with application server 130. For example, a client 140 may a computer, a laptop, a tablet, a mobile device, an appliance, a television, a smart device, a kiosk, and the like. The user interfaces of the applications 145 may include user interfaces suited for reporting time sheet information, data analysis, and/or any other functions based on the data of data store 110. Presentation of a user interface may include any degree or type of rendering, depending on the type of user interface code generated by server 130. For example, a client 140 may execute a Web Browser to request and receive a Web page (e.g., in HTML format) from application server 130 via HTTP, HTTPS, and/or Web Socket, and may render and present the Web page according to known protocols. One or more of clients 140 may also or alternatively present user interfaces by executing a standalone executable file (e.g., an .exe file) or code (e.g., a JAVA applet) within a virtual machine.

Figure 2:
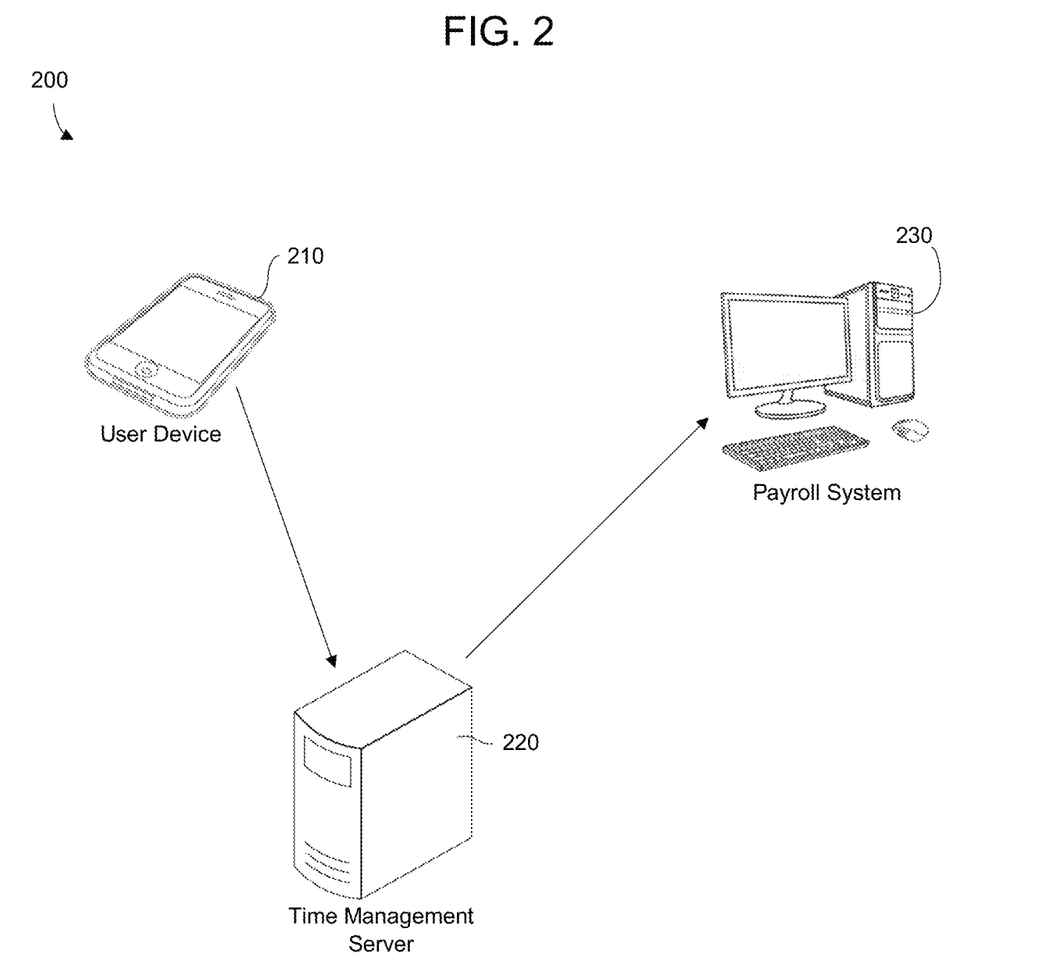
FIG. 2 is a diagram illustrating a system for retroactively changing time sheets in accordance with an example embodiment.

FIG. 2 illustrates a system 200 for retroactively changing time sheets in accordance with an example embodiment. For example, the system 200 may correspond to the architecture 100 shown in FIG. 1, or some other architecture. Referring to FIG. 2, the system 200 includes a user device 210, a time management server 220, and a payroll system 230. The devices may be connected to each other via a network such as the Internet or a private network. The user device 210 may be used by a user such as an employee to upload time sheet data to the time management server 220. Here, the user device 210 may include a computer, a laptop, a mobile device, a tablet, a kiosk, or the like, including an input unit such as a touch pad, keyboard, mouse, microphone, camera, and the like. The time sheet data may represent an amount of time that the employee worked during a particular period of time (e.g., a week, two weeks, a month, or the like). Also, the time sheet data may include various attributes such as an amount of hours/days worked, overtime information, money spent by the employee on behalf of the employer (reimbursements), and the like. The time sheet data may be approved by a supervisor of the employee either before it is uploaded to the time management server 220 or after it has been uploaded to the time management server 220. The time sheet data may be stored by the time management server 220 and transferred to the payroll system 230 for processing a payment to the employee.

The time management server 220 (or an externally connected database or cloud platform) may store attributes about an employee to be used for processing payments to the employee such as a previously defined work schedule, a pay rate, a position, an internal department in which the employee is employed, and the like. The attributes may be provided to the payroll system 230 to process a paycheck for the employee. According to various embodiments, a change may occur to an attribute of an employee during the middle of a time sheet. For example, a time sheet may represent time accrued by the employee between a Sunday thru a Saturday of a week (i.e., a 7 day period). The time sheet may include attributes such as hours worked, hourly rate, schedule, time-off, vacation days, and the like. Here, a change to an attribute may occur at some point in the middle of the week (i.e., Monday, Tuesday, Wednesday, Thursday, Friday, etc.). The change may affect the amount of money that should be paid to the employee. As another example, the change may affect the internal department where the employee works thus changing what internal department that gets credited for the employee's wages. Previously, systems were unable to incorporate such changes occurring in the middle of a time period (e.g., mid-week) but instead maintained the same attributes throughout the time sheet such as pay rate, schedule, department, etc. for the entire period. As a result, the employee could be paid an improper amount (e.g., too much or too little), the payment may be credited to the wrong department, wrong account, and/or the like.

The time management server 220 according to various embodiments may detect a change of an attribute occurring during a time sheet period that was previously incompatible with the system or incapable of being handled by the system, and retroactively apply the change to a portion of the time sheet even though the time sheet has already been submitted. For example, the time management server 220 may perform a periodic determination (e.g., daily, weekly, etc.) to identify any changes that have occurred to employee attributes which can affect employee time sheet processing. For example, the time management server 220 may search for markers (e.g., tags, flags, notifications, etc.) stored within a database storing employee information. The markers may also be generated by a transaction changing the attributes such as a change in pay rate, a schedule, an overtime amount, and the like, of an employee. In this case, the management server 220 may generate the marker in response to the transaction. In this example, the database may be coupled to the time management server 220 or connected externally thereto and may identify a change to an attribute of an employee that affects processing of a previously submitted time sheet. In response to detecting the marker, the time management server 220 may determine what the change is and retroactively apply the change to a portion of an already submitted time sheet without employee/manager interaction.

For example, the change may occur during the middle of a week of time included in the time sheet, and may only affect a portion of the week but not the entire week. That is, the change in the attribute may affect one or more days but not all of the days included in the week. As can be appreciated, the system must maintain the employee's old payment attribute information because the first portion of the time sheet is still processed according to the old information. Furthermore, the system must somehow implement the employee's new payment attribute information without deleting the old payment attribute information. In this case, the time management server 220 may auto generate a new time sheet in which a portion of the old time sheet, before the change, is preserved including attributes such as pay rate, hours, department, and the like, and a second portion of the time sheet, after the change, is replaced with new or replacement information (e.g., a new hours, new pay rate, new department, etc.) The time management server 220 may detect changes from the database without input from a user and automatically make the changes to time sheets stored within the database which have already been approved without requiring a re-approval process.

Figure 3:
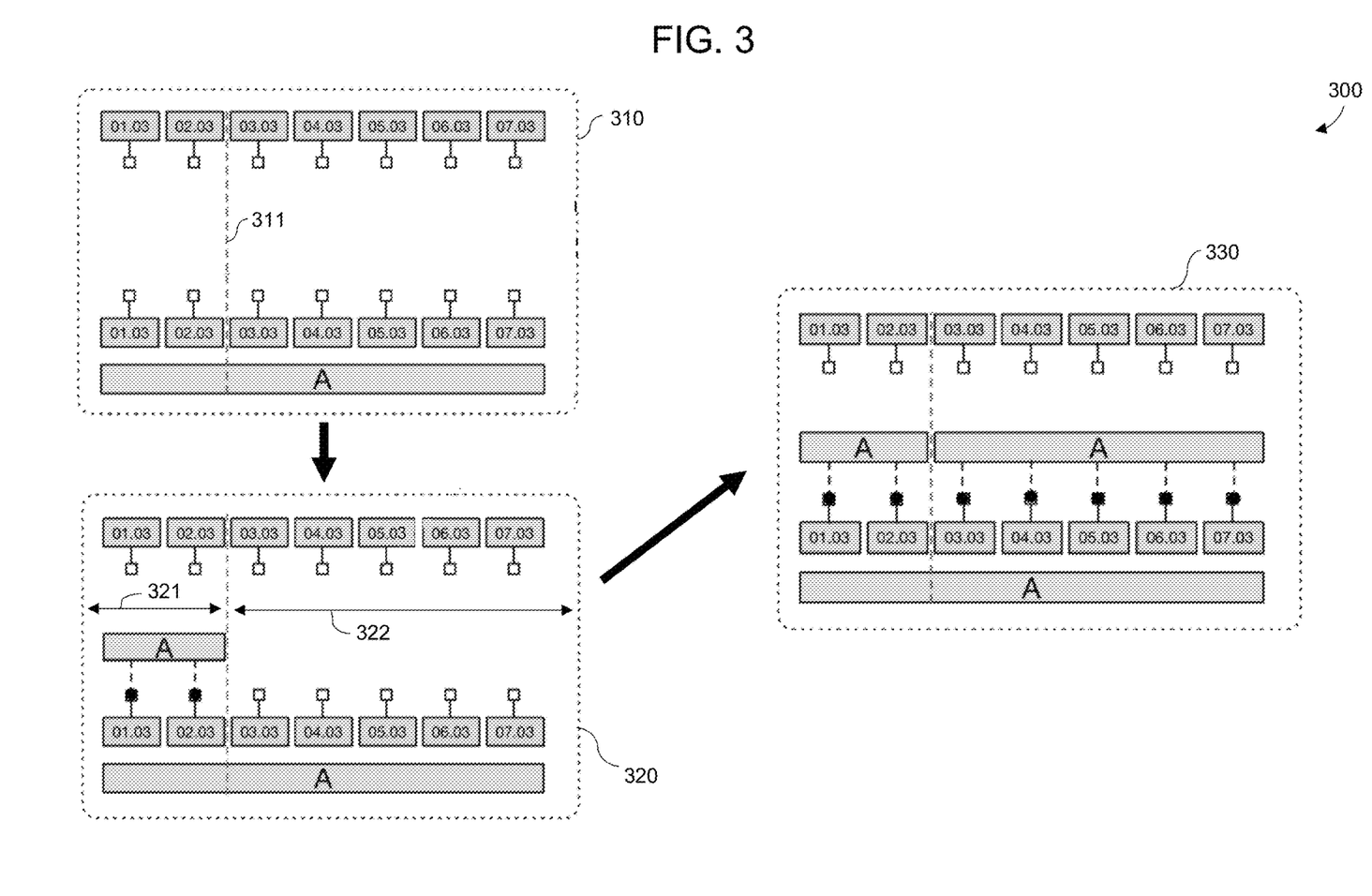
FIG. 3 is a diagram illustrating a process of changing a time sheet in accordance with an example embodiment.

FIG. 3 illustrates a process 300 of retroactively changing a time sheet in accordance with an example embodiment. For example, the process 300 may be performed by the time management server 220 in FIG. 2, or some other device or cloud platform. Time sheets may have a status assigned thereto from among a plurality of possible status including pending, approved, canceled, and the like. A time sheet in status pending approval is a time sheet that has been submitted by a user but that is waiting for approval (e.g., approval from a manager, supervisor, administrator, etc.), while an approved time sheet has been approved and might be waiting payroll processing. Meanwhile, a canceled time sheet is no longer pending or approved and is not to be processed for payment. There are other statuses such as pending that represents a time sheet in draft mode by a user which still needs to be submitted to the system for approval, and the like.

Referring to FIG. 3, the process 300 includes a time sheet 310 that has been submitted by a user. The time sheet 310 includes seven days and has already been approved by a manager. In this example, a change 311 to an attribute of the employee is detected after submission of the time sheet 310. The change 311 occurs between the second day and the third day of the week included in the time sheet 310. The change in the attribute causes a change in the processing of a payment to the user. For example, the change may affect one or more payment attributes such as a pay rate of the user, an amount of hours worked by the user within the week, a department in which the user works, and the like.

In response to detecting the change 311, the process 300 creates an intermediate time sheet 320 in which the time sheet has been split into a first portion of time 321 before the change occurs and a second portion of time 322 after the change occurs. Here, the first portion of time 321 includes the first two days of the week and the second portion of time 322 includes the other five days of the week. In this example, the process 300 keeps the time sheet data included in the first portion of time 321 because this data is still valid. However, the data after the change corresponding to the second portion of time 322 is removed. Next, the process 300 generates a replacement time sheet 330 in which the data for the first potion of time 321 is preserved from the intermediate time sheet 320 and new data for the second portion of time 322 is added. The replacement time sheet 330 includes data from the first portion of time 321 including the preserved data merged with data from the second portion of time 322 including the modified data. Here, the new data may be based on a new pay rate, a new amount of hours, a new department, and/or the like. As another example, the second portion of time 322 may be null data in which no time/hours were accrued by the employee. In this example, the retroactive change may replace payment data with information indicating that the employee did not accrue payment information for the second portion of time 322. After the change has been retroactively applied, the replacement sheet 330 may be used to replace the original time sheet 310 in the database to reflect the change made to the second portion of time 322.

Figure 4A:
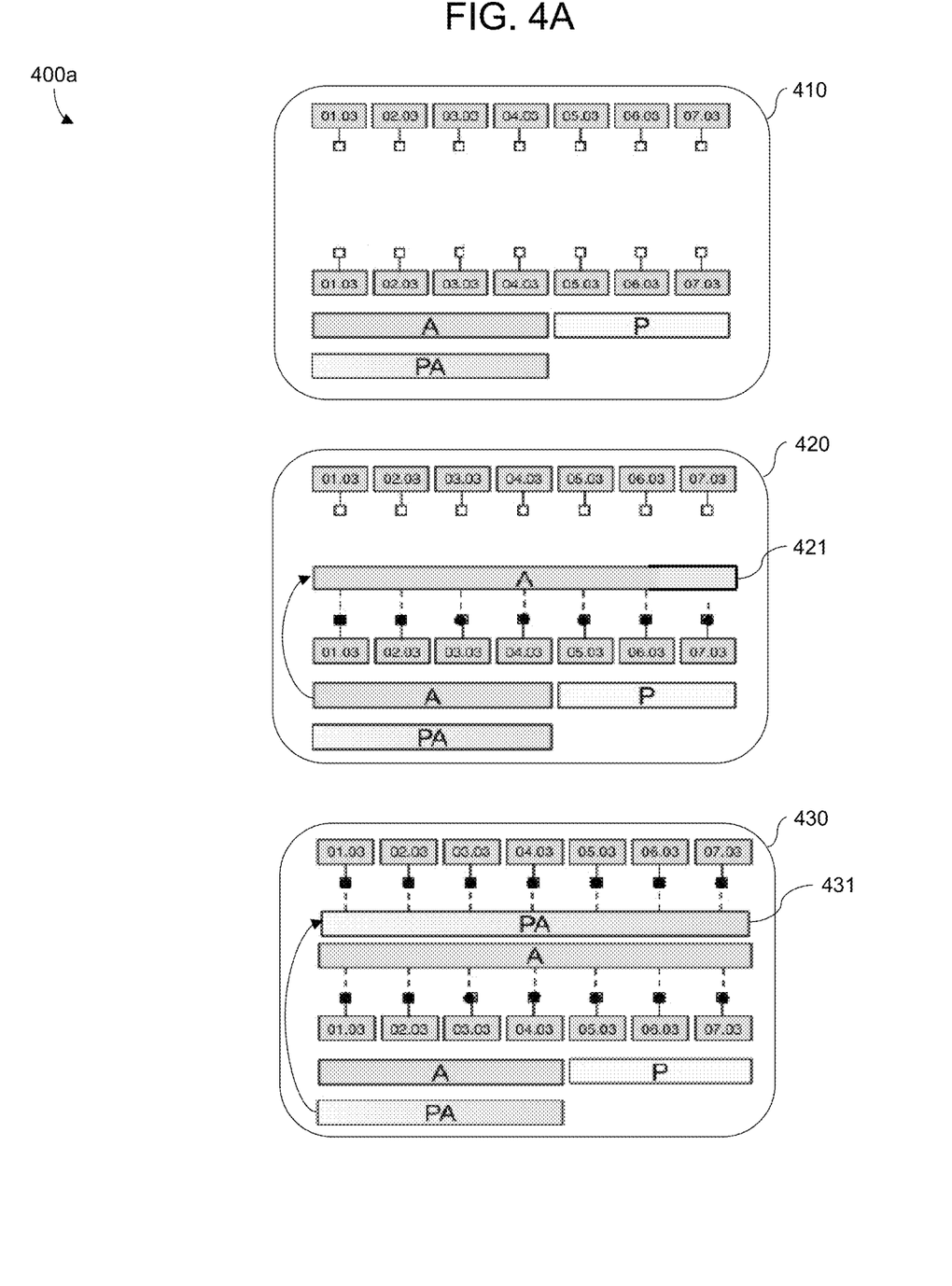
FIGS. 4A-4B are diagrams illustrating a process of changing a time sheet in accordance with another example embodiment.
Figure 4B:
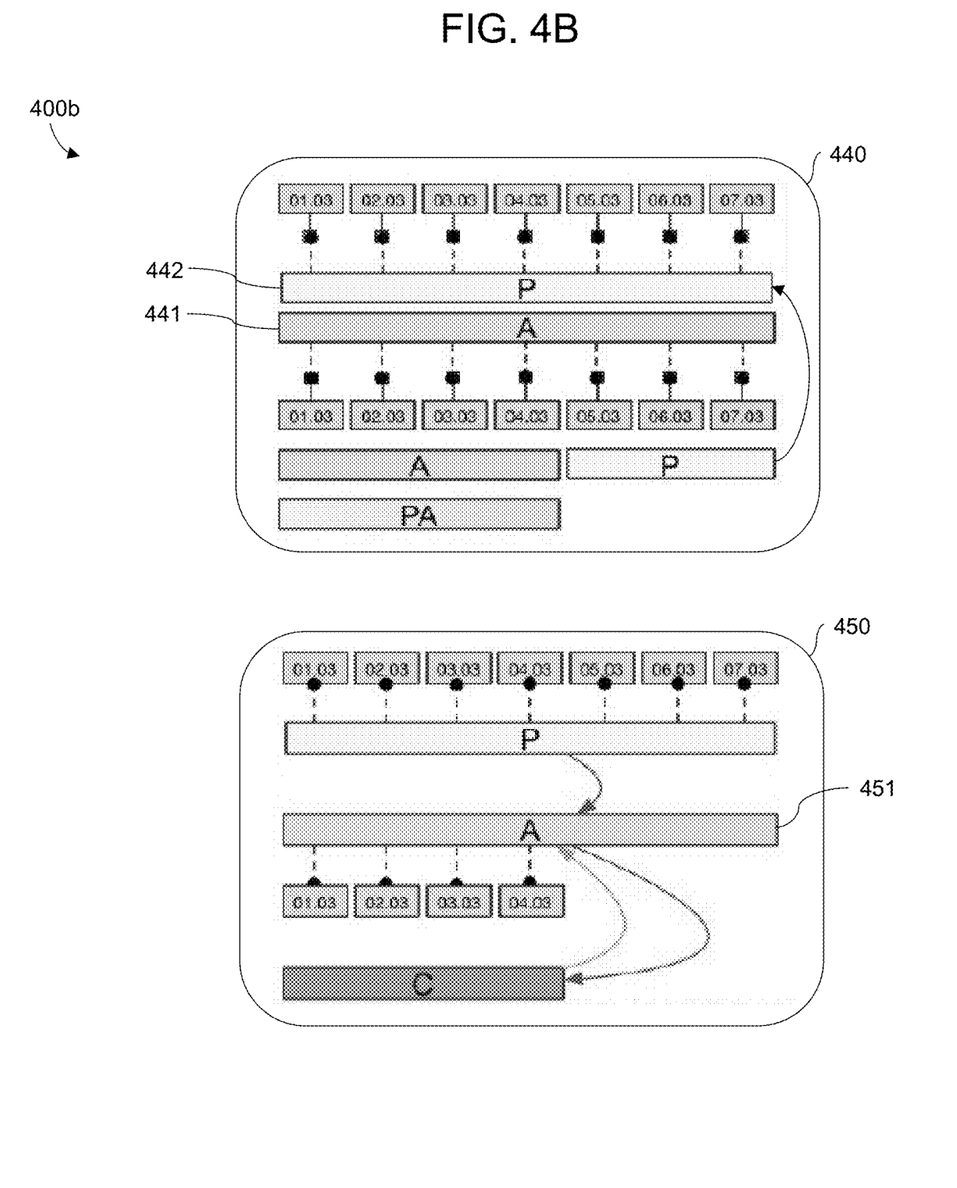

FIGS. 4A-4B illustrates a process 400a-400b of changing a time sheet in accordance with another example embodiment. In this example, a time sheet is split between an already approved portion of time A and a pending period of time P awaiting approval. The process 400a-400b removes the split between the two portions of time and generates one finally approved time sheet without requiring an additional approval process. Referring to FIG. 4A, an initial time sheet 410 is submitted that represents a week of time and includes a first portion of time A between the first and fourth days of the week which has been approved by a manager and a second portion of time P between the fifth and seventh days of the week which has not yet been sent for approval. For example, an employee may submit the time sheet 410 for approval after the fourth day of the week and have it approved by the manager. Furthermore, in this example, at some point the employee realizes they forgot to change something during the first portion of the week. Therefore, the employee makes a change to one of the days in the beginning of the week and ends up three time sheet portions as shown in 410 including the old portion of time A, the corrected old portion of time pending approval PA that still needs managerial approval, and a pending portion of time P including entries for the rest of the week which has not yet been sent to approval.

In this example, the three time portions can be converted into two final time sheets covering the full week. In this case, there is a time sheet in status approved containing all records that were already approved and a time sheet in status pending approval containing the changes which are still subject to an approval workflow. The approved time sheet typically cannot be removed from the system because it has already been approved and often sent to payroll. In this case, if the pending approval time sheet were to be rejected, the existence of the approved time sheet would be still valid, and the system could attempt to make changes again and submit another time sheet pending approval. As another example, the employee could simply discard the attempt to change the approved time sheet and accept the already approved time sheet. In 420, a new time sheet A 421 is created that covers the full week and includes the time sheet entries from the previously approved portion of time A. In 430, the time entries in the pending approval portion of time PA are used to create a new pending time sheet portion 431 that covers the whole week (this is the time sheet information that needs to be kept). In 440, the pending time P is added to the pending approval portion of the time to create a pending time sheet 442 which includes both the pending time and the pending approval time and the old time sheet 441 which contains the approved old time A. In 450, the final time sheet 442 is marked as a replacement for the old time sheet 451 and the old time sheet 441 is canceled.

Figure 5:
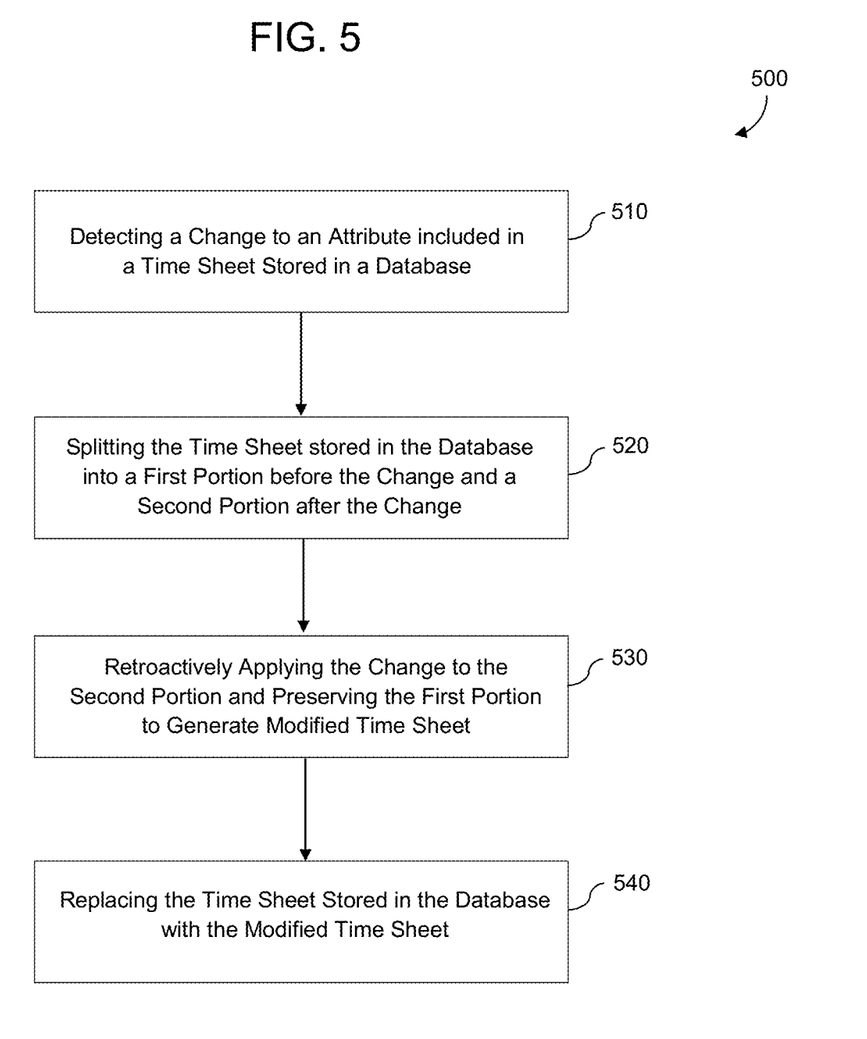
FIG. 5 is a diagram illustrating a method for retroactively changing time sheets in accordance with an example embodiment.

FIG. 5 illustrates a method 500 for retroactively changing time sheets in accordance with an example embodiment. For example, the method 500 may be performed by the time management device 220 shown in FIG. 2, or another device. Referring to FIG. 5, in 510 the method includes detecting a change associated with a time sheet stored in a database. The time sheet may be a payroll time sheet of an employee and has stored therein an amount of time that the employee worked during a payroll period corresponding to the time sheet. In this example, the change may include a change of an attribute included in the time sheet that affects payroll processing such as a change in pay rate, a change in hours performed, a change in department within a company, and the like. In other words, the change may somehow affect how much the user is paid, a department that is credited for the user's wages, and/or the like. The change may be marked within the database by the database using a marker, tag, flag, or some other notification. In this example, the detecting in 510 may be based on a marker that is stored in the database that identifies the attribute for the respective time sheet or the user that has been changed.

In 520, the method further includes splitting the time sheet into a first portion of time before the attribute changed and a second portion of time after the attribute changed. For example, the time sheet may include a predetermined period of time such as a week, two weeks, ten days, or the like. However, the change may only affect a portion but not all of the predetermined period of time. Therefore, the time sheet may be split into a first portion that is not affected by the change, and a second portion that is affected by the change. For example, the change of the attribute may happen between a first day and a last day of a time period represented by the time sheet, but not on either of the first day on the last day of the time period. In some examples, the change of the attribute may be the result of a new month or year beginning and/or a previous month or year ending.

In 530, the method includes retroactively applying the change of the attribute within the database to the second portion of time within the database, preserving the attribute within the database with respect to the first portion of time, and generating a modified time sheet based on the preserved attribute for the first portion of time and the retroactively changed attribute for the second portion of time. The retroactively applying the change may be performed automatically and without user interaction. In other words, the system or application corresponding to the method may automatically detect the change within the database and apply the change to a previously submitted time sheet. For example, the change that is retroactively applied may include one or more of a change within the database to at least one of the number of hours worked by the employee, the pay rate of the employee, and the department of the employee, to the second portion of time but not the first portion of time within the time sheet. Next, in 540 the method includes replacing the time sheet stored in the database with the modified time sheet to implement the retroactively applied change to the second portion of time.

Figure 6:
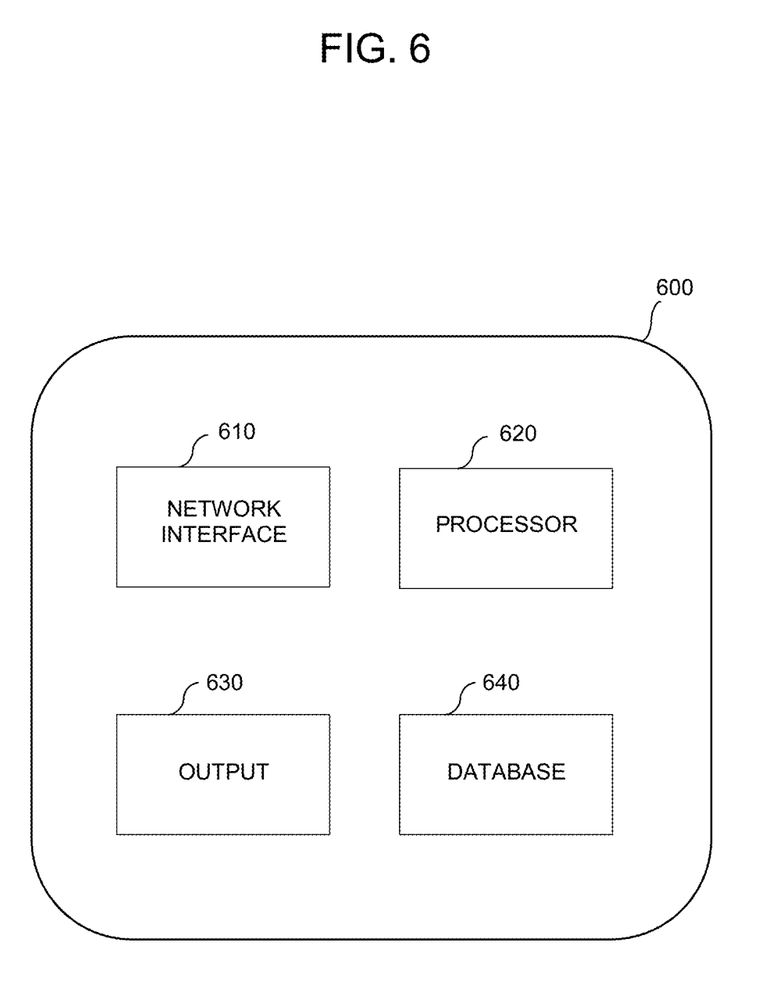
FIG. 6 is a diagram illustrating a device for retroactively changing time sheets in accordance with an example embodiment.

FIG. 6 is a diagram illustrating a device 600 for retroactively changing time sheets in accordance with an example embodiment. For example, the device 600 may be the time management device 220 of FIG. 2, or another device. Also, the device 600 may perform the method of FIG. 5. Referring to FIG. 6, the device 600 includes a network interface 610, a processor 620, an output 630, and a storage device 640. Although not shown in FIG. 6, the device 600 may include other components such as a display, an input unit, a receiver/transmitter, and the like. The network interface 610 may transmit and receive data over a network such as the Internet, a private network, a public network, and the like. The network interface 610 may be a wireless interface, a wired interface, or a combination thereof. The processor 620 may include one or more processing devices each including one or more processing cores. In some examples, the processor 620 includes a multicore processor or a plurality of multicore processors. Also, the processor 620 may be fixed or it may be reconfigurable. The output 630 may output data to an embedded display of the device 600, an externally connected display, a cloud, another device, and the like. The storage device 640 is not limited to any particular storage device and may include any known memory device such as RAM, ROM, hard disk, and the like. In this example, the storage device 640 may be a database storing time sheet data. As another example, the database may be externally connected to the device 600 for example, through a wired connection or through a network, cloud, Internet, or a combination thereof.

According to various embodiments, the processor 620 may detect a change to an attribute associated with a time sheet stored in a database. For example, the time sheet may be a payroll time sheet of an employee and has stored therein an amount of time that the employee worked during a payroll period corresponding to the payroll time sheet. Here, the change to the attribute may include a change to one or more of a number of hours worked by an employee, a pay rate of the employee, a department of the employee, and the like. The change may be detected by the processor 620 based on a marker stored in the database in association with the user (or the timesheet) indicating that the attribute has changed. The processor 620 may split the time sheet into a first portion of time before the attribute changed and a second portion of time after the attribute changed, retroactively apply the change of the attribute within the database to the second portion of time, preserve the attribute within the database with respect to the first portion of time, and generate a modified time sheet based on the preserved attribute for the first portion of time and the retroactively changed attribute for the second portion of time. For example, the processor 620 may the processor may retroactively apply a change within the database to at least one of the number of hours worked by the employee, the pay rate of the employee, and the department of the employee, to the second portion of time but not the first portion of time within the time sheet. Furthermore, the processor 620 may replace the time sheet stored in the database with the modified time sheet to implement the retroactively applied change to the second portion of time.

The example embodiments are directed towards a system for automatically detecting and retroactively applying changes to time sheets previously stored in a database. When a time sheet is approved by a manager and stored at a central backend server or cloud platform, the time sheet is typically not capable of being modified by the employee. However, often times there are changes that occur that affect processing of the employee's time sheet, for example, a change in pay rate, a promotion, a move to a new department, a change in schedule, and many others. A significant amount of these changes go undetected until the time sheet has already been processed (i.e., when the employee receives their paycheck, or at some later date). According to various embodiments, the system may identify these changes after the time sheet has already been submitted and retroactively apply (i.e., automatically) the detected changes to the time sheet without the need for a system admin to access the time sheet, the employee to update the time sheet, or for a supervisor to approve the time sheet. The system may detect these changes on a daily basis and apply them before the time sheet is process by a payroll department.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing device comprising:
a storage device; and
a processor configured to:
access a time sheet stored in a database, the time sheet comprising an amount of time that a person has worked during a time period, and
automatically, without user input:
search for a tag, flag, or notification indicating a change to an attribute associated with the time sheet, wherein the attribute comprises at least a pay rate, schedule, or department associated with the person,
split the time sheet into a first portion of time before the attribute changed and a second portion of time after the attribute changed in response to the tag, flag, or notification, and
apply the change of the attribute within the database to the second portion of time and preserve the attribute within the database with respect to the first portion of time to generate modified time sheet data,
wherein the processor is further configured to update the time sheet stored in the database based on the modified time sheet data to implement the applied change.

2. The computing device of claim 1, wherein the processor is configured to detect the change to the attribute based on a marker stored in the database which indicates that the attribute has been changed.

3. The computing device of claim 1, wherein the time sheet comprises a payroll time sheet of an employee and comprises an amount of time that the employee worked during a payroll period corresponding to the payroll time sheet.

4. The computing device of claim 1, wherein the change to the attribute comprises a change to one or more of a number of hours worked by an employee, a pay rate of the employee, and a department of the employee.

5. The computing device of claim 4, wherein the processor is configured to retroactively apply a change to at least one of the number of hours worked by the employee, the pay rate of the employee, and the department of the employee, to the second portion of time but not the first portion of time within the time sheet.

6. The computing device of claim 1, wherein the change of the attribute happens between a first day and a last day of a time period represented by the time sheet, but not on either of the first day or the last day of the time period.

7. The computing device of claim 1, wherein the processor is further configured to auto approve the retroactively applied and implemented change to the time sheet within the database without requiring a supervisor or an administrator to approve the change, and transmit the auto approved time sheet to a payroll processing system for processing the time sheet.

8. A method comprising:
accessing a time sheet stored in a database, the time sheet comprising an amount of time that a person has worked during a time period; and
automatically, without user input:
searching for a tag, flag, or notification indicating a change to an attribute associated with the time sheet, wherein the attribute comprises at least a pay rate, schedule, or department associated with the person;
splitting the time sheet into a first portion of time before the attribute changed and a second portion of time after the attribute changed in response to the tag, flag, or notification;
applying the change of the attribute within the database to the second portion of time and preserving the attribute within the database with respect to the first portion of time to generate modified time sheet data; and
updating the time sheet stored in the database based on the modified time sheet data to implement the applied change.

9. The method of claim 8, wherein the detecting the change comprises detecting a marker stored in the database which indicates that the attribute has been changed.

10. The method of claim 8, wherein the time sheet comprises a payroll time sheet of an employee and comprises an amount of time that the employee worked during a payroll period corresponding to the payroll time sheet.

11. The method of claim 8, wherein the change to the attribute comprises a change to one or more of a number of hours worked by an employee, a pay rate of the employee, a department of the employee, and a change of rules in calculating time pay rates.

12. The method of claim 11, wherein the retroactively applying comprises retroactively applying a change to at least one of the number of hours worked by the employee, the pay rate of the employee, and the department of the employee, to the second portion of time but not the first portion of time within the time sheet.

13. The method of claim 8, wherein the change of the attribute happens between a first day and a last day of a time period represented by the time sheet, but not on either of the first day or the last day of the time period.

14. The method of claim 8, wherein the method further comprises auto approving the retroactively applied and implemented change to the time sheet within the database without requiring a supervisor or an administrator to approve the change, and transmitting the auto approved time sheet to a payroll processing system for processing the time sheet.

15. A non-transitory computer readable medium having stored therein instructions that when executed cause a computer to perform a method comprising:
accessing a time sheet stored in a database, the time sheet comprising an amount of time that a person has worked during a time period; and
automatically, without user input:
searching for a tag, flag, or notification indicating a change to an attribute associated with a time sheet, wherein the attribute comprises at least a pay rate, schedule, or department associated with the person;
splitting the time sheet into a first portion of time before the attribute changed and a second portion of time after the attribute changed in response to the tag, flag, or notification;
applying the change of the attribute within the database to the second portion of time and preserving the attribute within the database with respect to the first portion of time to generate modified time sheet data; and
updating the time sheet stored in the database based on the modified time sheet data to implement the applied change.

16. The non-transitory computer-readable medium of claim 15, wherein the detecting the change comprises detecting a marker stored in the database which indicates that the attribute has been changed.

17. The non-transitory computer-readable medium of claim 15, wherein the time sheet comprises a payroll time sheet of an employee and has stored therein an amount of time that the employee worked during a payroll period corresponding to the payroll time sheet.

18. The non-transitory computer-readable medium of claim 15, wherein the change to the attribute comprises a change to one or more of a number of hours worked by an employee, a pay rate of the employee, and a department of the employee.

19. The non-transitory computer-readable medium of claim 18, wherein the retroactively applying comprises retroactively applying a change to at least one of the number of hours worked by the employee, the pay rate of the employee, and the department of the employee, to the second portion of time but not the first portion of time within the time sheet.

20. The non-transitory computer-readable medium of claim 15, wherein the change of the attribute happens between a first day and a last day of a time period represented by the time sheet, but not on either of the first day or the last day of the time period.

\* \* \* \* \*